(No Model.)

J. V. MEIGS.
MACHINE FOR FEEDING CARTRIDGE SHELLS.

No. 340,234. Patented Apr. 20, 1886.

5 Sheets—Sheet 1.

Witnesses
Wm. S. Brown
N. P. Ockington

Inventor
Joe V. Meigs
By David Hall Rice
Atty (No Model.) 5 Sheets—Sheet 2.
J. V. MEIGS.
MACHINE FOR FEEDING CARTRIDGE SHELLS.
No. 340,234. Patented Apr. 20, 1886.
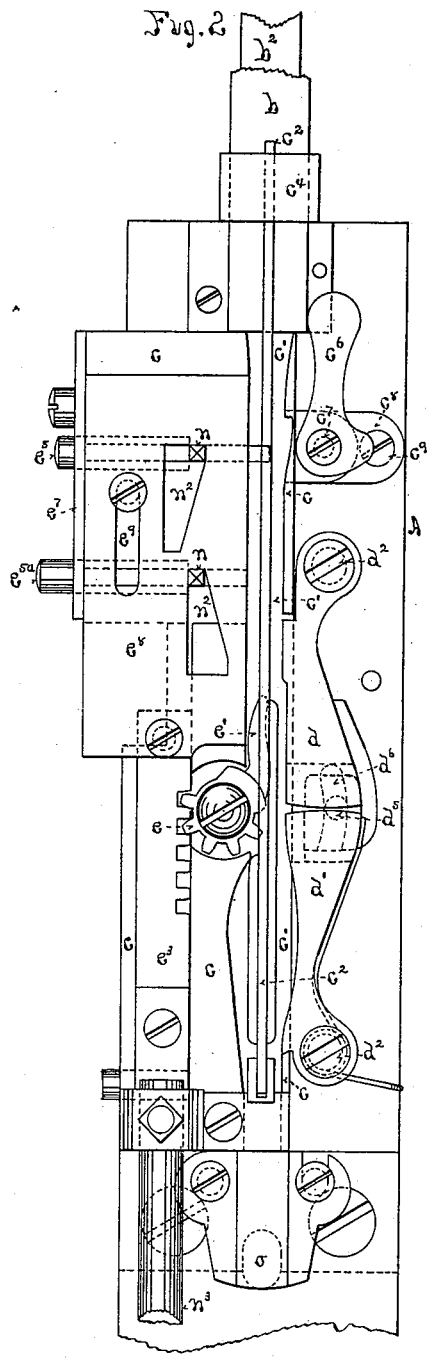
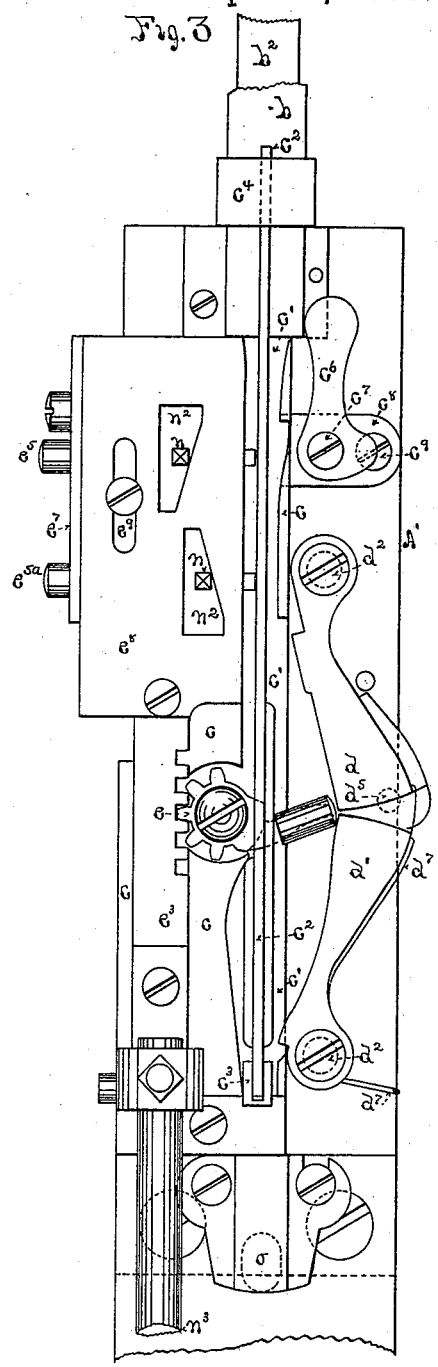
Witnesses
Inventor (No Model.) 5 Sheets—Sheet 3.

J. V. MEIGS.
MACHINE FOR FEEDING CARTRIDGE SHELLS.

No. 340,234. Patented Apr. 20, 1886.

Witnesses
Wm S. Brown
N. P. Ockington

Inventor
Joe V. Meigs
By David Hall Rice
Atty.

N. PETERS, Photo-Lithographer, Washington, D. C.

(No Model.) 5 Sheets—Sheet 4.
J. V. MEIGS.
MACHINE FOR FEEDING CARTRIDGE SHELLS.

No. 340,234. Patented Apr. 20, 1886.

Witnesses
Wm. S. Brown
N. P. Ockington

Inventor
Joe V. Meigs
By David Hall Rice
Atty (No Model.)  5 Sheets—Sheet 5.

J. V. MEIGS.
MACHINE FOR FEEDING CARTRIDGE SHELLS.

No. 340,234. Patented Apr. 20, 1886.

Witnesses
Wm. B. Brown
N. P. Ockington.

Inventor
Joe V. Meigs
By David Hall Rice
Atty

UNITED STATES PATENT OFFICE.

JOE V. MEIGS, OF LOWELL, MASSACHUSETTS.

MACHINE FOR FEEDING CARTRIDGE-SHELLS.

SPECIFICATION forming part of Letters Patent No. 340,234, dated April 20, 1886.

Application filed November 6, 1883. Serial No. 111,026. (No model.)

*To all whom it may concern:*

Be it known that I, JOE V. MEIGS, of Lowell, in the county of Middlesex and State of Massachusetts, have invented a new and useful Improvement in Machines for Feeding Cartridge-Shells, of which the following is a specification.

My invention relates to machines for feeding cartridge-shells to drawing, heading, and other machines to which it may be necessary to feed them before the heads are formed on them; and it consists in a combination of mechanisms by which the shells are automatically taken from the mass of them and fed with the closed end in advance into a suitable passage leading to machines of the above description, substantially as hereinafter described.

Figure 1:
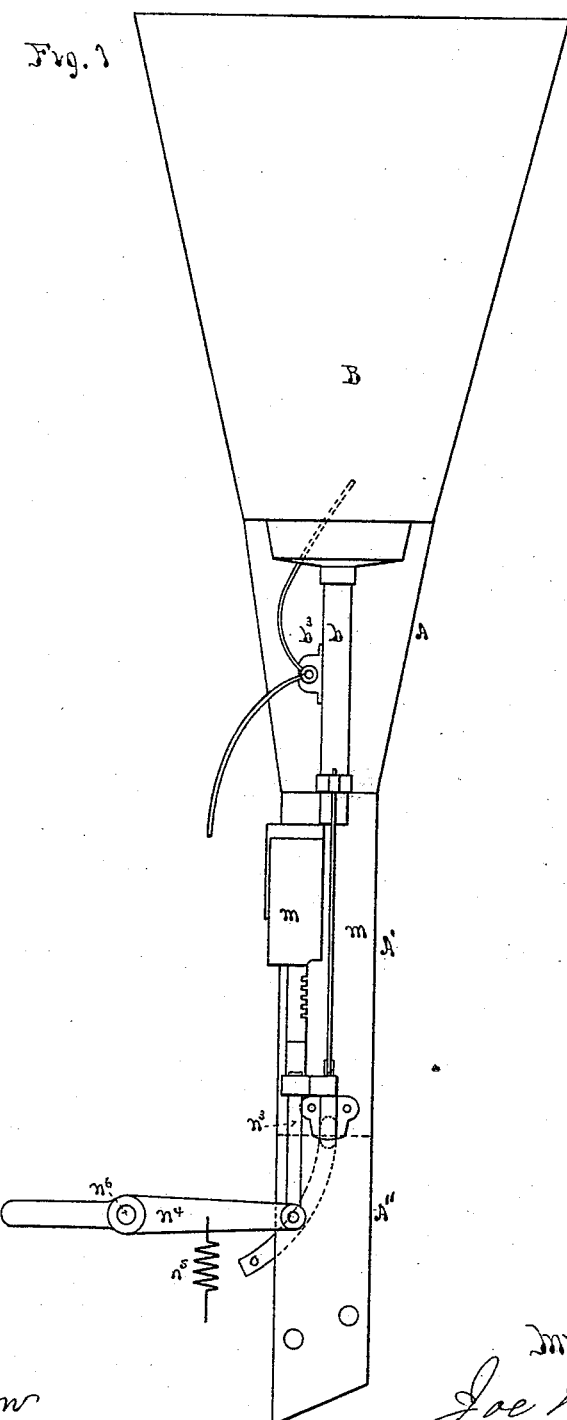
Figure 4:
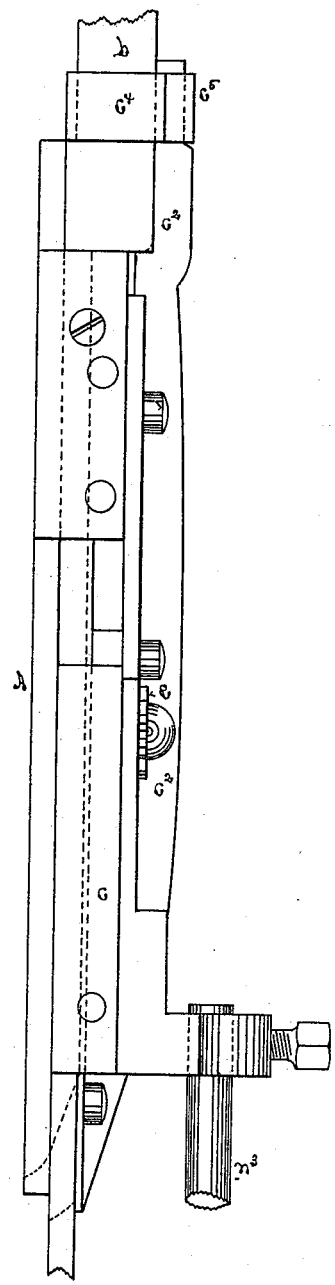
Figure 5:
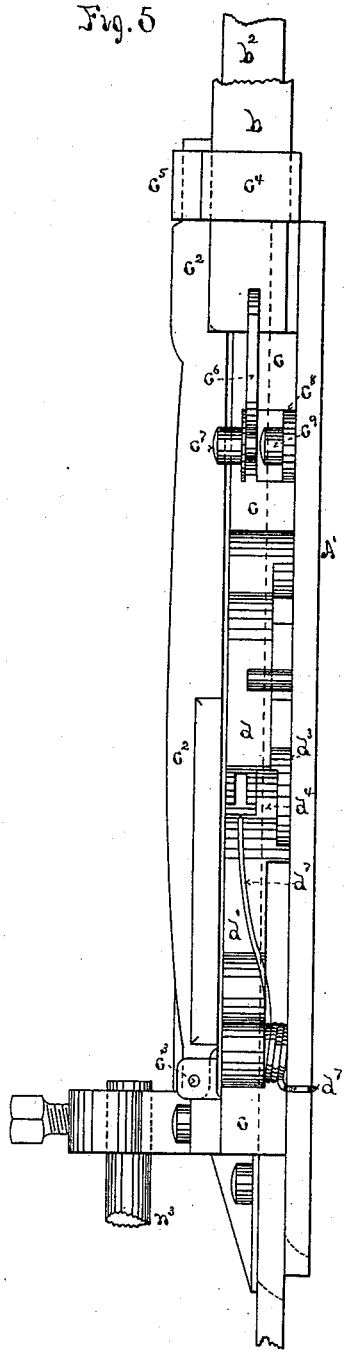
Figure 7:
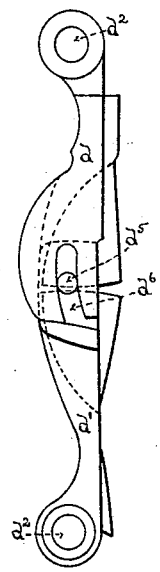
Figure 8:
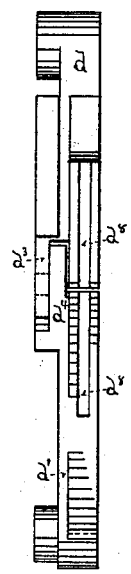
Figure 6:
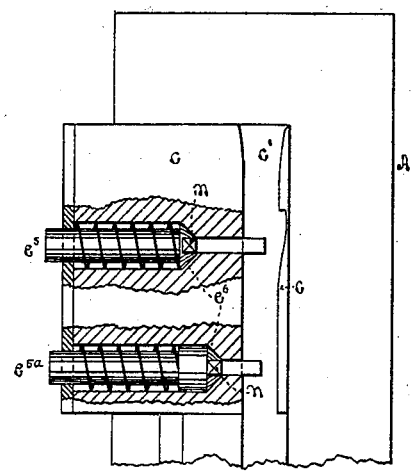
Figure 9:
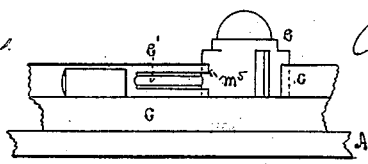
Figure 10:
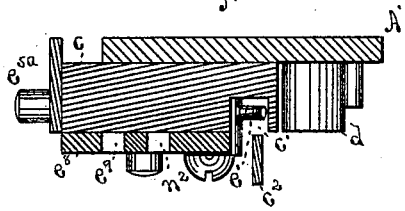
Figure 11:
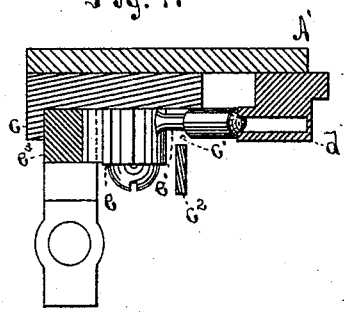

In the drawings, Figure 1 is a front view, in elevation, of the feeding mechanism constructed according to my invention. Fig. 2 is an enlarged detail front view of the mechanism in position for receiving the cartridge-shell to reverse it, if it enters the conduit wrong end foremost, or to allow it to pass downward without reversing, if it enters right end foremost. Fig. 3 is a like view of the same mechanism in the act of reversing the shell to bring it right end foremost. Fig. 4 is a side view of the same mechanism, looking at the left-hand side of Fig. 2. Fig. 5 is a side view of the same, looking at the right-hand side of Fig. 2. Fig. 6 is a detailed view of the stops of the shell-feeding conduit, for separating the shells in the conduit, as hereinafter described. Figs. 7 and 8 are enlarged views from the side and edge, respectively, of a portion of the shell-reversing mechanism, as hereinafter described. Fig. 9 is a detailed view of another portion of the shell-reversing mechanism, showing how the shell is discharged after being reversed. Fig. 10 is a transverse section of Fig. 2 just above the lever lettered $d$, as hereinafter described. Fig. 11 is a transverse section of Fig. 3 just above the shell-reversing finger lettered $e'$, as hereinafter described.

A A' A'' is a base-plate, to which the working parts are attached. This base-plate is made of iron in three parts, A A' A'', secured together by screws, for convenience, in the ordinary manner; or they may all be screwed to a single plate behind them.

At the upper end of base-plate A is secured a hopper, B, of the ordinary construction and form, for holding articles such as grain, &c. This hopper is of wood, funnel-shaped, and into its bottom end projects the tube $b$. Within the tube $b$ is fitted, so as to slide up and down freely, a second tube, $b^2$, the upper end of this latter tube rising inside the hopper B to some distance above the upper end of tube $b$ at every reciprocal movement. Tube $b^2$ is reciprocated up and down by an ear, $b^3$, attached to it and projecting through a vertical slot in tube $b$, in which it works freely and far enough to give the desired reciprocation. To the ear is shown attached a cord or strap for communicating to it the reciprocating motion. All these parts, consisting of the combination of the hopper with fixed tube $b$ and its internal vertically-reciprocating tube, $b^2$, are well known for the same purpose as herein described to those skilled in cartridge-shell machines, and do not require further description.

When a quantity of cartridge-shells have been dumped into the hopper B sufficient to cover the ends of tubes $b$ and $b^2$, and of such diameter as to freely pass longitudinally down this tube when introduced in it, the movement of the tube up and down through this mass of cartridge-shells, as is well known, results in its picking up and filling itself constantly with shells, which enter it either end foremost and fall down through the tube. As before stated, I reverse those cartridge-shells which have entered the tube wrong end foremost by an automatic mechanism, which I will now describe. Upon the base-plate A', I attach a plate of metal, $c$, extending nearly the whole length of the base-plate. In this plate of metal, which is thick enough for the purpose, I form a longitudinal groove rectangular in cross-section, and of substantially the size of the hole in tube $b$, which it meets at its upper end and forms a substantial continuation downward, as shown in Figs. 2 and 3. This groove thus forms three sides of a conduit for the shells in continuation of tube $b$. The fourth or front side of this conduit I form in part by a bar, $c^2$. This bar is pivoted at $c^3$, Fig. 5, so as to swing forward when it is desired to get at the conduit $c'$ to remove any shell that may have become jammed or stuck in passing downward. When swung into place so that its inner straight edge forms the front face of the shell-conduit, the bar $c^2$ is secured by a sleeve, $c^4$, which surrounds and slides freely up and down the tube $b$, and has a mortise in a projection, $c^5$, on its front side, into which the upper end of bar $c^2$ is made to fit, Figs. 4 and 5. When it is desired to turn the bar forward, sleeve $c^4$ is slipped upward, withdrawing its mortise from bar $c^2$, when the latter can be swung outward and downward, leaving the conduit $c'$ open on its front side. On the right-hand side of conduit $c'$ the wall of the conduit is slotted, to allow the cam-shaped part of lever $c^6$ to enter the conduit and close it against the downward passage of the cartridge-shells, when this lever is moved on its pivot $c^7$, by which it is attached to the block of metal $c^8$, which is in turn secured to the base-plate $A'$ by a screw, $c^9$. Somewhat lower down the right-hand wall, Figs. 2 and 3, of the conduit $c'$ is cut away for over one-half its entire length, to receive the nearly-straight faces of the pivoted arms $d\ d'$, which are substantially in line with the inner face of this wall of conduit $c'$, and form a part of it for guiding the shell, as hereinafter described. These pivoted arms turn on studs $d^2\ d^2$, and have projections on their inner ends, $d^3$ and $d^4$, lapping past each other, $d^3$ being attached to arm $d$, and $d^4$ being attached to arm $d'$. In the projection $d^4$ is fixed a pin, $d^5$, which projects into a slot, $d^6$, in projection $d^3$, in which it works freely. The function of this arrangement is to cause both pivoted arms $d\ d'$ to swing away together when pressed outward from the position shown in Fig. 2 to that shown in Fig. 3, and form an elastic bearing-surface upon the shell, as hereinafter described. These pivoted arms are held in the position shown in Fig. 2 by a spring, $d^7$, attached to the base-plate $A'$, and bearing against the back edge of arm $d'$. In the flat faces of the arms $d\ d'$ is formed a slot, $d^8$, extending from one arm into the other where their ends join. Just opposite to this slot the wall of the conduit $c'$ on the left-hand side, Figs. 2 and 3, is cut away to receive a rotating disk, $e$, which has gear-teeth cut in its edge for part of its circumference, forming a mutilated gear, and has a finger, $e'$, of a curved form attached to its edge at the other and opposite part of its circumference. This mutilated gear revolves upon a pin or screw passing through its center and into plate $c$. The finger $e'$ is so curved that in one position (shown in Fig. 2) it will project upward in the conduit $c'$ substantially vertically, and so placed that when the mutilated gear $e$ is rotated it will just pass freely through the slot $d^8$ in arms $d\ d'$, and project downward in the part of the conduit $c'$ below, which is enlarged transversely to assist in discharging the shell from the finger at this point. As the finger $e'$ is revolved to its downward position, it retires for a part of its length into a groove, $m^5$, Fig. 9, in the wall of conduit $c'$ below mutilated gear $e$, which groove allows the finger to complete its movement downward, and at the same time, being just wide enough to receive the finger, throws the shell of the latter by bringing the curved side wall of conduit $c'$ to bear upon the open end of the shell on each side of groove $m^5$. In the plate $c$, I form a second groove substantially parallel to conduit $c'$, and in it fit the bar $e^3$, which has teeth in form of a rack to mesh with those of mutilated gear $e$ and revolve it, as the bar is reciprocated in its groove, which guides its motion, as shown. In the upper part of metal plate $c$, on the left-hand side, Figs. 2, 3, and 6, I form two parallel slots in its face at right angles to groove $c'$, and extending entirely across this side of plate $c$ into the latter groove. These grooves are made to receive two plungers, $e^5\ e^{5a}$, which are made to extend into conduit $c'$ by spiral springs placed around them and in the parts of their grooves which are enlarged, as shown, to receive them. These spiral springs bear at one end against shoulders $e^6\ e^6$ upon the plungers $e^5\ e^{5a}$ and at the other against a plate, $e^7$, which is secured against the edge of metal plate $c$, and is provided with holes into which plungers $e^5\ e^{5a}$ fit accurately, they being smaller than the slots at that end. The plungers $e^5\ e^{5a}$, when extending into conduit $c'$, form stops to arrest the cartridge-shells in falling down through the latter substantially as hereinafter described. On the outer side of each plunger $e^5\ e^{5a}$ is fixed a stud, $n$, projecting outward beyond the face of plate $c$. Against this face of this plate is placed a metal sliding piece, $e^8$, attached by a screw to bar $e^3$, so as to move with it and be kept in motion by it. This slide $e^8$ is guided by a slot, $e^9$, through it, which moves freely upon the barrel of a set-screw passing through it into the metal plate, $c$, beneath, as shown. This set-screw has its head overlapping slot $e^9$, which keeps sliding plate $e^8$ against the metal plate $c$ as it reciprocates.

In the plate $e^8$ are formed two cam-shaped slots, $n^2\ n^2$, through which studs $n\ n$ project. These slots have their cam-faces so arranged as to bear against these studs and move the upper plunger, $e^5$, back on the upward movement of plate $e^8$, and release the lower plunger, $e^{5a}$, and vice versa, thus keeping one or the other of these plungers in position to stop the cartridge-shells, and by their alternate movement allowing but one at a time to drop below them, as hereinafter described.

To the lower end of bar $e^3$ is attached a piston-rod, $n^3$, which is pivoted to the end of lever $n^4$, Fig. 1, which is held downward by spiral spring $n^5$, and pivoted at $n^6$, and worked by hand or any suitable driving mechanism.

$m\ m$ are casings put over the working parts to protect them from injury.

$o$ is a tube connected to the conduit $c'$, to receive the shells and carry them to the drawing-machine. If desired, stud $b^3$ may be connected with lever $n^4$.

The operation of the machine is as follows: The stud $b^3$ and attached tube $b^2$ being worked up and down, the upper end of the latter, reaching into the mass of cartridge-shells in the hopper B, fills the tube and conduit $c'$ with shells, resting end to end, the lowest one being arrested by upper plunger, $e^5$, projecting into conduit $c'$. Sliding bar $e^3$ and plate $e^8$ are now quickly reciprocated by lever $n^4$, allowing one shell to drop to lower plunger $e^{5a}$, and thence downward against finger $e'$, which will be in the position shown in Fig. 2, to receive it as the latter plunger is withdrawn. Only one of the plungers—viz., $e^{5a}$—might be used, if desired, to feed the shells to finger $e'$; but I prefer the use of two, as shown. Other suitable mechanism may also be used to reverse the finger $e'$ or to operate the plunger-stops $e^5$ $e^{5a}$ without departing from the spirit of my invention. If the cartridge-shell has descended closed end foremost, as is desired, it will merely drop down between mutilated gear-wheel $e$ and lever $d$ $d'$ at the next movement of the mutilated gear-wheel, and pass out through tube $o$. If, on the contrary, the shell descends the wrong or open end foremost, it will fall down over and around the finger $e'$, which is made small enough to enter the shell, and the next movement of rack-bar $e^3$ will carry the mutilated gear-wheel $e$ and finger $e'$ around, as shown in Fig. 3. The shell, being too large to pass through the finger-slot $d^8$, presses out pivoted levers $d$ $d'$, which thereby hold the shell on the finger $e'$ until it is completely reversed and drops downward off the finger and through tube $o$, closed end foremost. As will be seen, each movement of lever $n^4$ allows a shell to pass through the machine, reversing it if wrong or open end foremost, thereby insuring great rapidity and certainty of operation, and avoiding the expense of manual labor in placing each shell properly for the drawing or other machine.

What I claim as new and of my invention is—

1. The combination of the conduit $c'$, for conducting the cartridge-shells, with the movable stop $e^{5a}$, the reversing-finger $e'$, and mechanism adapted to reverse the same, substantially as described.

2. In combination with the shell-conduit $c'$, the movable stops $e^{5a}$ and $e^5$, the reversing-finger $e'$, and mechanism adapted to reverse the same, substantially as described.

3. In combination with the shell-conduit $c'$, the reversing-finger $e'$, mechanism adapted to reverse the same, and opposite yielding levers $d$ $d'$, adapted to conform to the path of the shell, and constructed to maintain a pressure thereon during the reversing process, substantially as described.

4. In combination with shell-conduit $c'$, the reversing-finger $e'$, mechanism adapted to reverse the same, and opposite levers $d$ $d'$, provided with the slot $d^8$, substantially as described.

5. In combination with the shell-conduit $c'$, formed with three sides closed and one open, the hinged bar $c^2$, forming the fourth side, substantially as described.

6. In combination with the shell-conduit $c'$, the reversing-finger $e'$, mechanism adapted to reverse the same, and stop-lever $c^6$, substantially as described.

7. In combination with the shell-conduit $c'$, the reversing-finger $e'$, mutilated gear $e$, attached thereto, and rack $e^3$, substantially as described.

8. In combination with shell-conduit $c'$, the plunger-stop $e^{5a}$, provided with stud $n$, and plate $e^8$, provided with cam-groove $n^2$, and mechanism adapted to reciprocate the plate, substantially as described.

9. In combination with shell-conduit $c'$, the plunger-stops $e^5$ $e^{5a}$, provided with studs $n$ $n$, and plate $e^8$, provided with cam-grooves $n^2$ $n^2$, and mechanism adapted to reciprocate the plate, substantially as described.

10. In combination with the shell-conduit $c'$, the hopper B, tubes $b$ $b^2$, the reversing-finger $e'$, and mechanism adapted to reverse the same, substantially as described.

11. In combination with the shell-conduit $c'$, the hopper B, tubes $b$ $b^2$, movable stop $e^{5a}$, the reversing-finger $e'$, and mechanism adapted to reverse the same, substantially as described.

12. In combination with the shell-conduit $c'$, the hopper B, tubes $b$ $b^2$, movable stops $e^5$ $e^{5a}$, the reversing-finger $e'$, and mechanism adapted to reverse the same, substantially as described.

13. In combination with the reversing-finger $e'$ and mechanism adapted to reverse the same, the gear $e$, rack $e^3$, plate $e^8$, provided with cam-grooves $n^2$ $n^2$, and plunger-stops provided with studs $n$ $n$, substantially as described.

14. In combination with the shell-conduit $c'$, the bar $c^2$, pivoted at one end, and the sliding sleeve $c^4$, provided with a mortise fitting over the bar at the other end, substantially as described.

15. In combination with the reversing-finger $e'$ and mechanism adapted to reverse the same, the shell-conduit $c'$, formed with an enlargement transversely just below the axis of the finger, substantially as described.

16. In combination with the shell-conduit $c'$, the shell-reversing finger $e'$ and mechanism adapted to reverse the same, substantially as described.

17. In combination with the shell-conduit $c'$, provided with groove $m^5$, the finger $e'$ and mechanism adapted to reverse it, substantially as described.

JOE V. MEIGS.

Witnesses:
DAVID HALL RICE,
N. P. OCKINGTON.